July 8, 1958     F. E. MARSH ET AL     2,842,396

DUMP VEHICLE TILTING MECHANISM

Filed March 16, 1953     3 Sheets-Sheet 1

INVENTORS.
FAYETTE E. MARSH
IRVEN W. McROBERTS
IRL W. ANSPACH
BY Flournoy Corey
ATTORNEY.

United States Patent Office 2,842,396
Patented July 8, 1958

2,842,396

DUMP VEHICLE TILTING MECHANISM

Fayette Elam Marsh, Irl W. Anspach, and Irven Wilbur McRoberts, Hastings, Nebr., assignors, by mesne assignments, to Wyatt Manufacturing Company, a corporation of Kansas Application March 16, 1953, Serial No. 342,332

5 Claims. (Cl. 298—22)

This invention relates to material handling devices and has particular reference to a dump body adapted to be mounted on an automotive truck employing a hydraulic system powered by an electric motor.

It is common practice to mount a hydraulic dump body on an automotive vehicle and use the automotive engine to provide the power required to drive the hydraulic system. Such an arrangement requires a special power take-off mechanism adapted to each individual make of truck. Many truck manufacturers provide for the mounting of such a mechanism in some models, while other units are not so equipped. When such provisions are not made, some makeshift arrangement must be supplied, such as a drive in conjunction with the fan belt. If the dump body is to be transferred from one make of truck to another, it may be necessary to discard the original power take-off mechanism and replace it with another at additional cost.

It is obvious that these difficulties could be eliminated if the hydraulic system were provided with its own power source. The most satisfactory and flexible power source would appear to be an electric motor driven by the common storage battery. However it will be seen that the marked advantages of an electric motor can only be made readily available if a lift mechanism is provided which can be actuated by an even power flow. For this reason, the common scissors mechanism usually provided to lift the dump box is not satisfactory since the power required to start movement is so much greater than that required when the scissors mechanism is more fully extended.

Our invention is therefore directed to a hydraulic dump mechanism in which the intial forces required to start the movement of the load are not substantially greater than those required to carry it throughout the arc of its movement.

It is another object of our invention to provide a dump box and power mechanism which is self contained and may be mounted on the conventional motor truck without any substantial alterations of either the truck or the dump box.

It is still another object of our invention to provide a dump truck mechanism which may be constructed of common structural steel shapes with the minimum of special castings and the like, and which may be mounted on an automotive vehicle without material increasing its height.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 3:
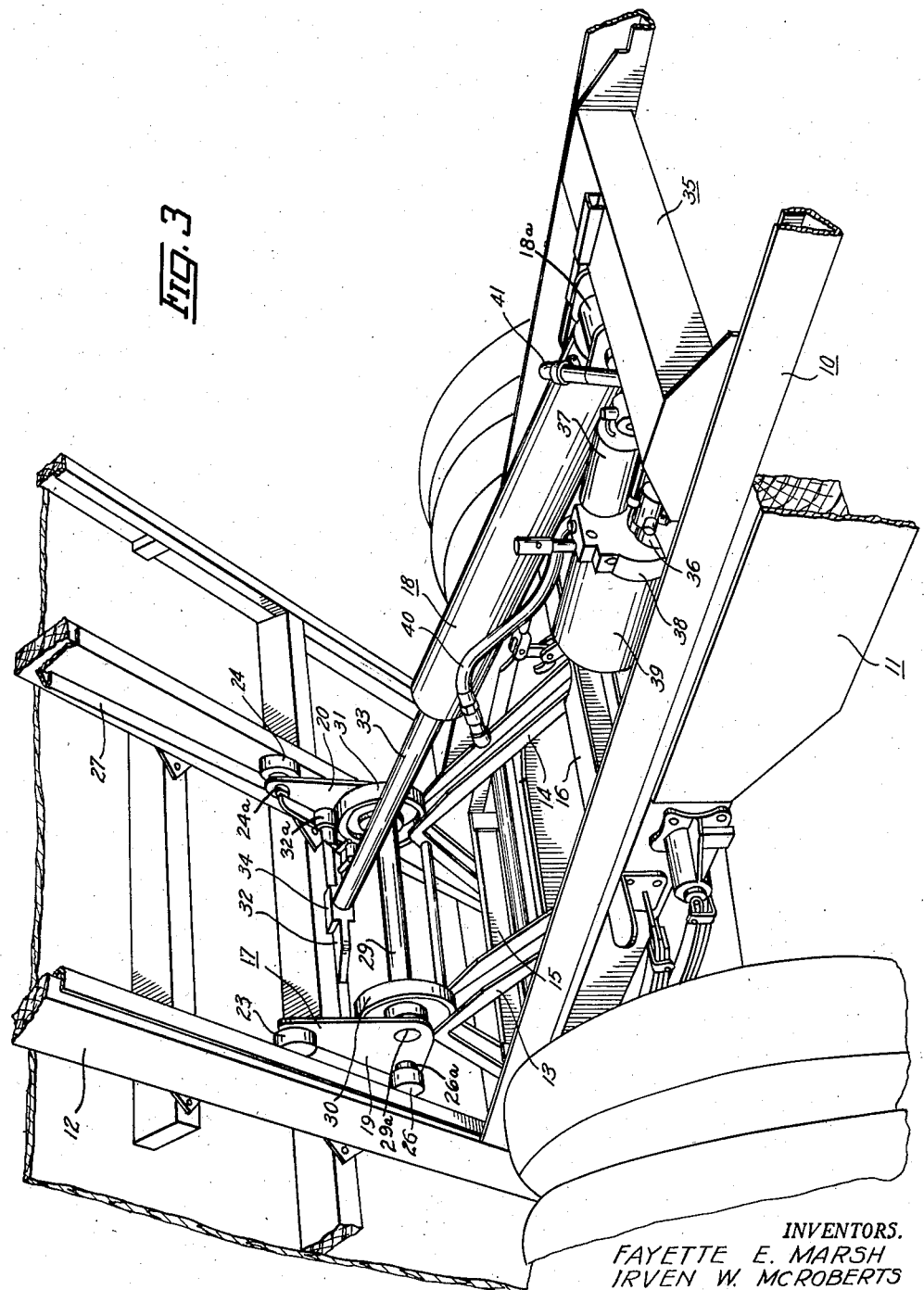
Figure 3 is another view in perspective showing the entire hydraulic system and lift mechanism as mounted on a conventional automotive truck. The dump box is again shown in an elevated position.

Referring now to the drawings, and more particularly to Figure 3 thereof, in practicing my invention I provide a hoist frame 10, which is mounted on the chassis frame 11. Pivotally mounted on the outer end of the hoist frame 10 is the dump frame 12. A pair of inclined chassis tracks 13 and 14 are mounted on the cross members 15 and 16 of the hoist frame 10. A triangular dolly, generally indicated at 17 and which will be described in more detail, is adapted to ride between said inclined tracks and the dump frame to bias the box in an upward arc. Movement of this dolly is provided by the extension and contraction of the hydraulic jack shown generally at 18.

Figure 1:
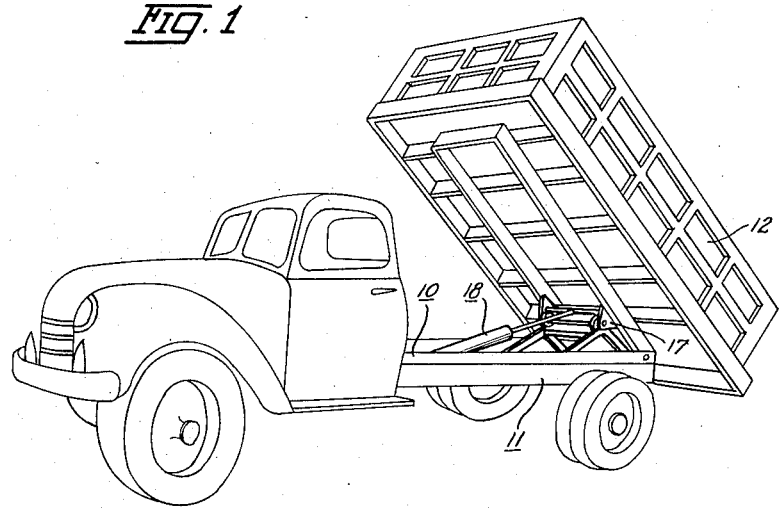
Figure 1 is a view in perspective of an automotive truck having a hydraulic dump box mounted thereon and shown in an elevated position to disclose a portion of a lift mechanism constructed according to my invention.
Figure 2:
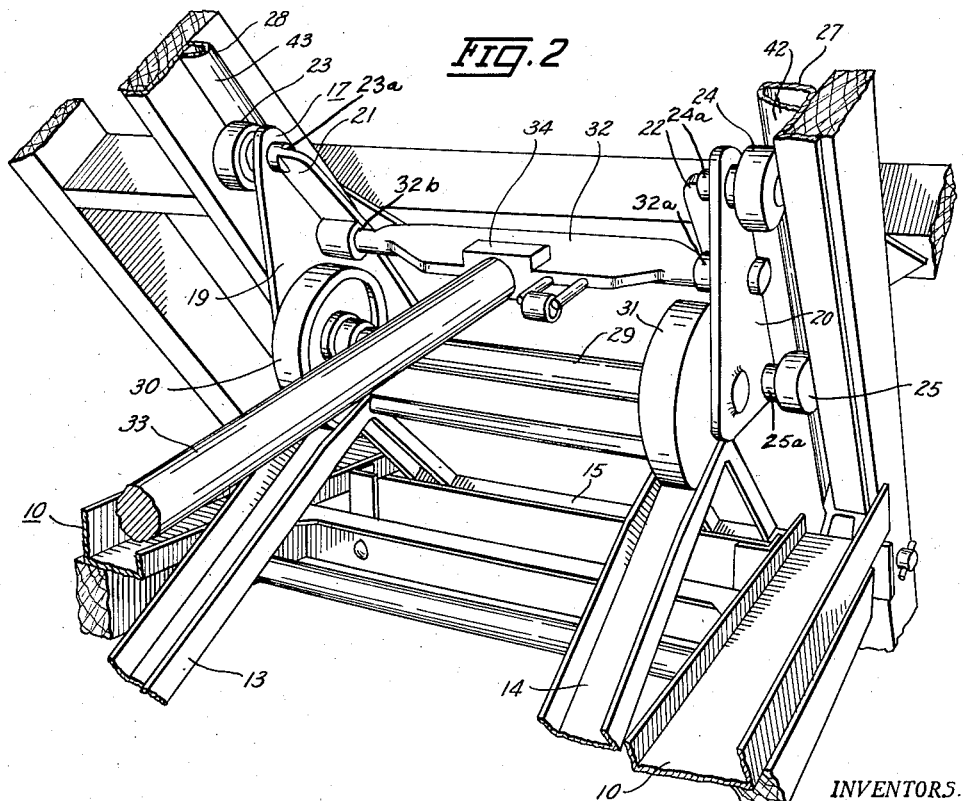
Figure 2 is a view in perspective showing the lift mechanism in detail, including the dolly and tracks and their relative position when the dump box is elevated as in Figure 1.

Referring now to Figure 2, in which the hoist mechanism is shown in more detail, it will be noted that the triangular dolly is comprised of two triangular plates 19 and 20 which are reinforced by flanges 21 and 22. Mounted on the upper corners of these triangular plates, at the outer ends of the previously mentioned flanges, are stub shafts, such as 23a, 24a, 25a, and 26a which carry rollers 23, 24, 25 and 26. The dump frame 12 has been provided with flanges 27 and 28 having angular tracks 42 and 43 thereon which are adapted to receive the previously mentioned rollers. The lower corner of the triangular plates are provided with openings such as 29a (Fig. 3) to receive cross shaft 29 which in turn carries two large rollers 30 and 31. All of the aforementioned rollers are so mounted that they may turn freely on their shafts.

A thrust plate 32 is pivotally mounted at 32a and 32b between the two triangular plates. The mounting of this thrust plate is of some considerable importance. It will be noted that the mounting point for each end of the plate is in substantially the same plane as that described by the rollers 23 and 26 and rollers 24 and 25, and further, that the mounting position is slightly forward of the center point between said rollers. This thrust plate serves to receive the force of the hydraulic jack 18, the ram 33 thereof being seated at 34 in the center of the thrust plate 32.

It is apparent that the disposition of this thrust plate causes the thrust force of the hydraulic jack to be imparted in substantially equal amount to all four rollers to prevent binding. At the same time the position of the thrust plate slightly forward of the center line causes a tilting motion in the dolly itself. Free movement of the thrust plate and jack ram is permitted by the fact that rollers 23, 24, 25 and 26 are mounted on stub shafts.

To make the assembly operable, the rollers 30 and 31 of the dolly 17 engage the inclined chassis tracks 13 and 14. These tracks are so mounted on the cross member 15 of the hoist frame that they extend below the rails of the hoist frame and thus permit the dolly 17 to nest between the rails when in a lowered position.

Referring again to Figure 3 and particularly to the mounting of the hydraulic jack as shown therein, it will be noted that a raised platform 35 has been provided as a part of the hoist frame 10, being attached to the inner flanges of the rails thereof. The hydraulic jack 18 is pivotally mounted on this platform 18a and so positioned that the platform 35, the jack 18, and the dolly 17 will all be in substantially the same horizontal plane when the dump box is moved to its lowered position.

The hydraulic pressure required to operate the jack 18 is supplied by the hydraulic pump 37 which is driven by an electric motor 36, the oil being supplied by the reservoir 39 and controlled by valve 38. The pump, motor, valve and reservoir comprise an assembly which is preferably mounted within the hoist frame 10 and near the hydraulic jack 18. Hoses 40 and 41 between the power assembly and the jack complete the hydraulic system.

Figure 4:
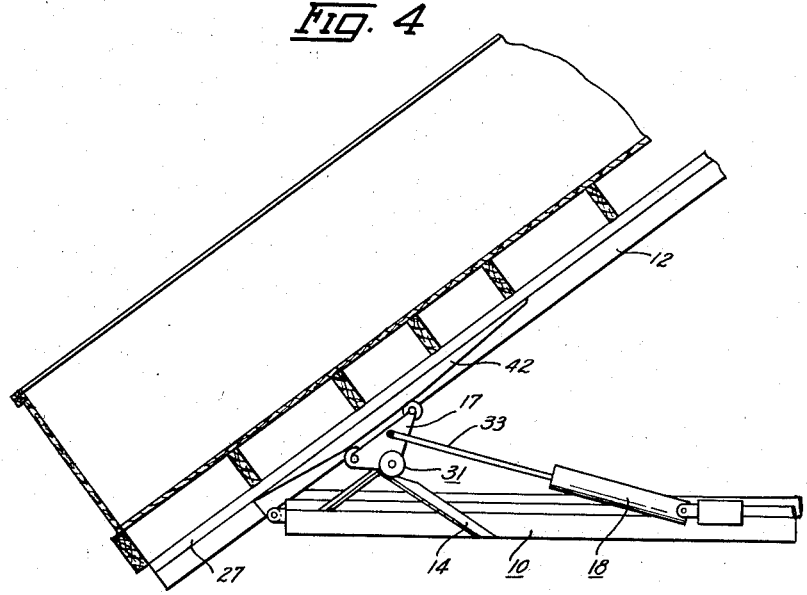
Figure 4 is a side view in cross section showing the relative position of the hydraulic jack, dolly and track when the dump box is in an elevated position.
Figure 5:
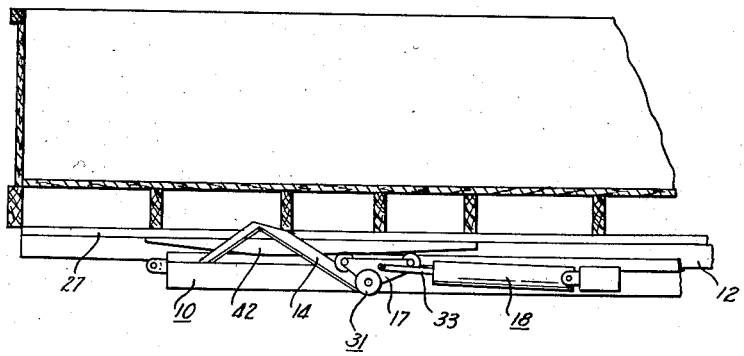
Figure 5 is another side view in cross section showing the relative position of the hydraulic jack, dolly and track when the dump box is in a lowered or carrying position.

We will now set forth the operation of the device heretofore described. Referring to Figures 4 and 5 wherein the hoist mechanism is shown first in the raised position and then in the lowered position, it will be noted that the dolly 17 performs the function of a wedge in relation to the inclined chassis track 14 and the dump frame 12. At the same time, it will be seen that the movement of the dump box in an upward and outward direction permits the hydraulic jack to exert its force in a path closer to the perpendicular as the box rises. The movement of the dolly in an arc about the roller 31 further aids this movement towards the perpendicular. It will be noted that the tilting of the dump box causes the load to slide out and thus lessens the weight on the hydraulic jack and lift mechanism. It will be noted from Figs. 4 and 5 that, while dump track 42 is approximately parallel to dump frame 12, preferably it is neither straight nor exactly parallel thereto. In the claims, "approximately parallel to said dump frame" is to be interpreted broadly as including variations from parallelism such as shown in Figs. 4 and 5.

From the foregoing description it will be apparent that we have provided a mechanical method whereby the forces required are substantially the same throughout the arc of movement and that, thereby, the power required of the electric motor is substantially uniform.

It will be further apparent that we have provided a hydraulic lift mechanism which is self-contained and which would not require any substantial modification of the motor truck and, further, one in which the overall height of the unit would not be much greater than if the hoist were not used.

Although we have described a specific embodiment of our invention, it will be understood that modifications of the herein described hydraulic lifting device may be made without departing from the spirit and scope of the present invention as set forth in the appended claims.

We claim as our invention:

1. An hydraulic lift device for a dump truck, said truck comprising a chassis frame and a dump frame pivotally mounted adjacent the rear of said chassis frame for rotation about an axis transverse to said chassis frame, said chassis frame having a chassis track extending longitudinally, upwardly, and rearwardly with respect thereto, with its rear portion adjacent the rear end of said chassis frame, said dump frame having a longitudinally disposed dump track above said chassis track, said dump track being disposed approximately parallel to said dump frame, an hydraulic cylinder pivotally attached at one end to said chassis frame at a position spaced forwardly of the pivotal mounting of the dump frame, a piston rod extending from the other end of said cylinder, a dolly pivotally attached to the end of said piston rod, said dolly comprising a triangular vertically disposed plate, a pair of upper rollers bearing against said dump track, said rollers being longitudinally spaced and rotatably mounted adjacent two respective corners of said triangular plate, a lower roller bearing against said chassis track, said lower roller being rotatably mounted adjacent the remaining corner of said triangular plate, said piston rod being pivotally attached to said triangular plate at a point intermediate said upper rollers and approximately on a straight line between the mounting points of said respective upper rollers on said triangular plate.

2. An hydraulic lift device in accordance with claim 1 wherein said piston rod is pivotally attached to said triangular plate at a point closer to the one of said upper rollers which is remote from the pivotal mounting of said dump frame than to the other of said upper rollers.

3. An hydraulic lift device in accordance with claim 1 wherein said upper rollers are substantially smaller in diameter than said lower roller, whereby support and lifting forces exerted through said plate will be distributed between said upper comparatively smaller rollers upwardly against said dump track and through said single comparatively larger lower roller downwardly against said chassis track.

4. An hydraulic lift device in accordance with claim 1 wherein said chassis frame has a second chassis track laterally spaced from said first-named chassis track and parallel thereto, said dump frame has a second dump track above said second chassis track, laterally spaced from said first-named dump track and parallel thereto, said dolly has a second triangular vertically disposed plate laterally spaced from said first-named triangular plate with its sides respectively parallel to the sides of said first-named triangular plate, a second pair of upper rollers bearing against said second dump track, said second pair of upper rollers being longitudinally spaced and rotatably mounted adjacent two respective corners of said second triangular plate, a second lower roller bearing against said second chassis track, said last-named roller being rotatably mounted adjacent the remaining corner of said second triangular plate, said piston rod being pivotally attached to each said trianglular plate at a point intermediate the respective upper rollers and approximately on a straight line joining the mounting points of the respective upper rollers on the respective triangular plates.

5. An hydraulic lift device in accordance with claim 4 wherein all of said upper rollers are substantially smaller in diameter than said lower rollers, whereby support and lifting forces exerted through said plates will be distributed between said upper comparatively smaller rollers upwardly against said dump tracks and through each said single comparatively larger lower roller downwardly against said respective chassis tracks.

References Cited in the file of this patent

UNITED STATES PATENTS

| | | |
|---|---|---|
| 1,715,491 | Barrett | June 4, 1929 |

FOREIGN PATENTS

| | | |
|---|---|---|
| 636,666 | France | Jan. 14, 1928 |
| 365,494 | Great Britain | Jan. 21, 1932 |